United States Patent
Kroeger et al.

(10) Patent No.: US 9,618,406 B2
(45) Date of Patent: Apr. 11, 2017

(54) SENSOR ELEMENT

(71) Applicant: PIEZOCRYST ADVANCED SENSORICS GMBH, Graz (AT)

(72) Inventors: Dietmar Kroeger, Graz (AT); Peter Schmid, Vienna (AT); Ulrich Schmid, Vienna (AT); Alexander Schricker, Graz (AT); Christof Zarfl, Graz (AT)

(73) Assignee: Piezocryst Advanced Sensories GmbH, Graz (AT)

( * ) Notice: Subject to any disclaimer, the term of this patent is extended or adjusted under 35 U.S.C. 154(b) by 34 days.

(21) Appl. No.: 14/842,193

(22) Filed: Sep. 1, 2015

(65) Prior Publication Data
US 2016/0069758 A1 Mar. 10, 2016

(30) Foreign Application Priority Data
Sep. 5, 2014 (AT) .................................. 50612/2014

(51) Int. Cl.
| | |
|---|---|
| G01L 1/04 | (2006.01) |
| G01L 1/26 | (2006.01) |
| G01L 9/00 | (2006.01) |
| G01L 19/04 | (2006.01) |
| G01L 1/18 | (2006.01) |
| G01L 1/22 | (2006.01) |

(52) U.S. Cl.
CPC .................. G01L 1/26 (2013.01); G01L 1/18 (2013.01); G01L 1/2287 (2013.01); G01L 9/0052 (2013.01); G01L 19/04 (2013.01)

(58) Field of Classification Search
CPC . G01L 1/26; G01L 1/18; G01L 1/2287; G01L 9/0052; G01L 9/04

USPC ............. 73/862.623, 862.627, 862.636
See application file for complete search history.

(56) References Cited

U.S. PATENT DOCUMENTS

| | | | |
|---|---|---|---|
| 5,519,374 A | 5/1996 | Schrank et al. | |
| 6,486,022 B2 | 11/2002 | Lee | |
| 6,729,187 B1 * | 5/2004 | Gregory ................ | G01L 1/2281 73/204.26 |
| 6,828,161 B2 | 12/2004 | Summerfelt et al. | |
| 6,915,055 B2 * | 7/2005 | Ide ......................... | G02B 6/122 385/130 |

(Continued)

FOREIGN PATENT DOCUMENTS

EP 2075563 7/2009

OTHER PUBLICATIONS

S. Fricke et al., "A robust pressure sensor for harsh environmental applications," Sensors and Actuators A, 184 (2012), pp. 16-21.

(Continued)

*Primary Examiner* — Max Noori
(74) *Attorney, Agent, or Firm* — Dykema Gossett PLLC

(57) ABSTRACT

A sensor element (1) includes a substrate (2) and a strain-sensitive element (3) which is preferably applied to the substrate by means of thin-film technology and is used for measuring the deformation of the substrate (2) when pressure is applied or a force is introduced, the strain-sensitive element (3) including $XAlO_yN_{1-y}$, wherein X is a metal with a high melting temperature in the range of greater than 1400° C. and $0<y<0.4$ applies. A passivation layer (5) can be applied to the strain-sensitive element (3).

13 Claims, 2 Drawing Sheets

(56) References Cited

U.S. PATENT DOCUMENTS

| | | | |
|---|---|---|---|
| 7,249,818 B1 | 7/2007 | Paasch | |
| 7,765,875 B2 | 8/2010 | Guo | |
| 8,001,844 B2 | 8/2011 | Fricke et al. | |
| 8,026,788 B2* | 9/2011 | Deiters | H01C 7/06 257/750 |
| 8,176,791 B2 | 5/2012 | Hegner et al. | |
| 8,191,426 B2* | 6/2012 | Gregory | G01L 1/2293 73/726 |
| 8,297,837 B1* | 10/2012 | Gaitas | H01C 7/006 257/53 |
| 8,356,514 B2* | 1/2013 | Wang | G01F 1/692 73/204.26 |
| 8,383,491 B2* | 2/2013 | Kurata | H01L 21/76254 257/E21.568 |
| 8,390,019 B2* | 3/2013 | Yamazaki | H01L 51/529 257/99 |
| 8,441,335 B2* | 5/2013 | Downey | H01C 17/22 29/610.1 |
| 8,586,130 B2 | 11/2013 | Meisner et al. | |

OTHER PUBLICATIONS

S. Uhlig et al., "Pressure sensitivity of piezoresistive nickel-carbon Ni:a-C:H thin films," Sensors and Actuators A, 193 (2013), pp. 129-135.

H. Schmid-Engel et al., "Strain Sensitive Pt—$SiO_2$ nano-cermet thin films for high temperature pressure and force sensors," Sensors and Actuators A, 206 (2014), pp. 17-21.

* cited by examiner

SENSOR ELEMENT

BACKGROUND OF THE INVENTION

Field of the Invention

The invention relates to a sensor element which includes a substrate having a strain-sensitive element preferably applied by means of thin-film technology, which element is used for measuring the deformation of the substrate when pressure is applied or a force is introduced.

The Prior Art

In order to measure static pressures for example, conventional sensor concepts which are mostly based on membranes use piezoresistive methods or so-called strain gauges (SG) in order to enable the detection of local mechanical strains in a highly precise way. Conventional SG materials (such as CrNi) cannot be used for high-temperature applications (up to 700° C.) because their electromechanical properties change irreversibly after high-temperature loading or show a strong tendency towards oxidation. Metallic materials with a high melting point such as Pt (see "A robust pressure sensor for harsh environmental applications", S. Fricke, A. Friedberger, H. Seidel, U. Schmid, Sensors and Actuators A: Physical, Volume 184, September 2012, Pages 16-21) can principally be used up to the indicated temperature range, but they have a very high temperature coefficient of electrical resistance (TCR), which requires the highest precise temperature measurement on the sensor element which can hardly be realised technically over the entire temperature range.

The object is thus the development of thin-film systems with high temperature stability, a TCR close to zero and the highest possible K factor, which is a measure for the change in the electrical resistance under mechanical strain.

Ni:a-C:H thin films fulfil the latter two requirements, but they are only stable up to approximately 300° C. Such layers are described for example in "Pressure sensitivity of piezoresistive nickel-carbon Ni:a-C:H thin films", Steffen Uhlig, Hanna Schmid-Engel, Tobias Speicher, Günter Schultes, Sensors and Actuators A: Physical, Volume 193, 15 Apr. 2013, Pages 129-135.

In this context, EP 1 991 849 B1 discloses a high-temperature pressure sensor element for measuring pressures even above 400° C. The high-temperature pressure sensor element or a pressure sensor consists of a substrate in which an inner region is configured. Furthermore, a deformable membrane is provided, which in operation separates the inner region from the outer region and deforms during a change of the external pressure in relation to the pressure in the inner region. An arrangement or a structure of strain gauges is arranged on the deformable membrane, which strain gauges form a strain gauge element for measuring the deformation of the membrane. The membrane, the substrate and the strain gauge element are formed from one and the same high-temperature-stable material, preferably an alloy such as a nickel base alloy. An electrical insulating layer is arranged between the strain gauge element and the membrane, which insulating layer consists of BN, MgO or $Al_2O_3$. The strain gauge element can further comprise a passivation layer which consists of the material of the insulating layer. It is disadvantageous that the aforementioned metallic alloys have a relatively high TCR value.

"Strain sensitive Pt—SiO2 nano-cermet thin films for high temperature pressure and force sensors", H. Schmid-Engel, S, Uhlig, U. Werner, G. Schultes, Sensors and Actuators A. Physical, Volume 206, 1 Feb. 2014, Pages 17-21, discloses thin-film high-temperature strain gauges made of Pt—$SiO_2$ for example which have a high K factor and low temperature coefficient of resistance (TCR) and can be used in a temperature range of up to 300° C.

It is the object of the invention to further develop a sensor element with a substrate which comprises a strain-sensitive element in such a way that high temperature stability, a TCR close to zero and the highest possible K factor can also be realised in the high-temperature range.

SUMMARY OF THE INVENTION

This object is achieved in accordance with the invention in such a way that the strain-sensitive element consists of $XAlO_yN_{1-y}$, wherein X is a metal with a high melting temperature in the range of greater than 1400° C. and 0<y<0.4 applies.

The strain-sensitive element preferably consists of a composite layer which is applied with the PVD process (e.g. sputtering or vapour-deposition process) or CVD process, wherein the strain-sensitive element contains at least one metal X from the group of Ti, Ta and Pt.

It is known that $XAlO_yN_{1-y}$ layers have high oxidation resistance. It was now recognised that the electromechanical characteristic values (K factor, TCR) also show outstanding values with respect to the use as SG. A further degree of freedom is created by means of the additional oxygen fraction in order to enable setting the electromechanical characteristic values in a purposeful manner.

In accordance with the invention, the fraction of aluminium in the strain-sensitive element, which enters into a dielectric connection with nitrogen and oxygen, is weighted with respect to the fraction of the metallic components in such a way that the TCR of the strain-sensitive element assumes minimal values, preferably close to zero.

A metallic component is thus added in addition to the aluminium fraction when building the layers. The composite layer is preferably deposited by a sputtering process in thin-film technology, wherein it is possible by the combination of metallic fraction (with TCR>0) and dielectric matrix (with TCR<0) in one layer to set TCR close to zero and to additionally achieve a high K factor (>2).

It is desirable for the use as a sensor over a longer period of time under extreme temperature loads to introduce a thin film into a defined atmosphere which guarantees that no conversion processes commence in the layer at high temperatures.

The strain-sensitive element is thus preferably arranged in a closed sensor atmosphere with a defined oxygen fraction, preferably in a sealed sensor housing. The high-temperature behaviour of the layer can be kept at a very stable level by the introduction of the $XAlO_yN_{1-y}$ thin film into a closed sensor atmosphere, whose environment is dominated for example by a nickel base material (e.g. Haynes 230). The nickel base alloy binds the residual oxygen in the sensor atmosphere at high temperatures, wherein reintroduction of atmospheric oxygen is prevented by the sealed configuration. As a result, a defined oxygen fraction is situated in the sensor atmosphere and the oxidation behaviour of the thin film can be controlled very well by the ratio of the oxidic and nitridic fractions. As a result, changes in the layer can be minimised over a long period of time.

In accordance with the invention, the strain-sensitive element can comprise a passivation layer, preferably made of $Al_2O_3$ or AlN. Long-term stability can increased even further by applying a high-temperature-stable passivation.

The invention will be explained below in greater detail by reference to the drawings:

DETAILED DESCRIPTION OF THE DEPICTED EMBODIMENTS

Figure 1:
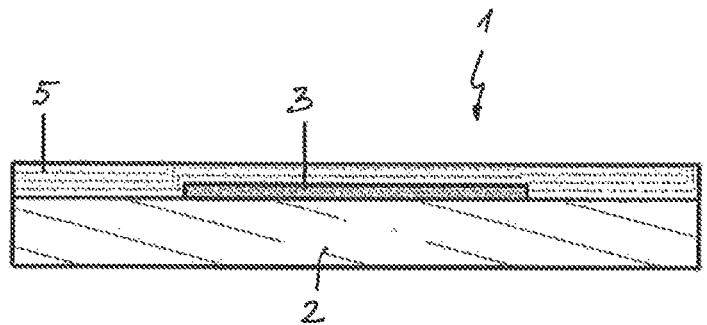
FIG. 1 shows a sectional view of a sensor element in accordance with the invention.
Figure 2:
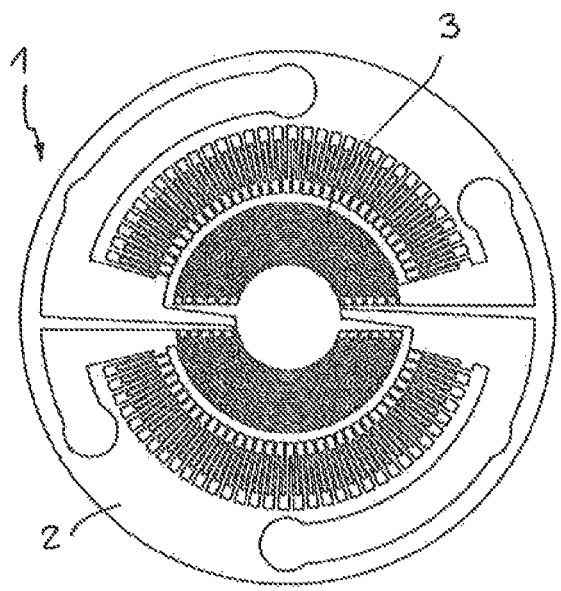
FIG. 2 shows a top view (without passivation layer) of a sensor element in accordance with the invention.

FIGS. 1 and 2 show a sensor element 1 in accordance with the invention with a substrate 2, which comprises a strain-sensitive element 3 which is applied by means of thin-film technology and which is used for measuring the deformation of the substrate 2 when subjected to pressure or a force is introduced. The strain-sensitive element 3 consists of $XAlO_yN_{1-y}$, wherein X is a metal with a high melting temperature such as titanium. The factor y lies in a range of between 0 and 0.4. The strain-sensitive element 3 and the adjacent substrate region comprise a passivation layer 5 made of $Al_2O_3$ for example.

In the top view according to FIG. 2, the passivation layer was omitted so that the strain-sensitive element 3 is shown as a meandering SG plus connecting contacts.

Figure 3:
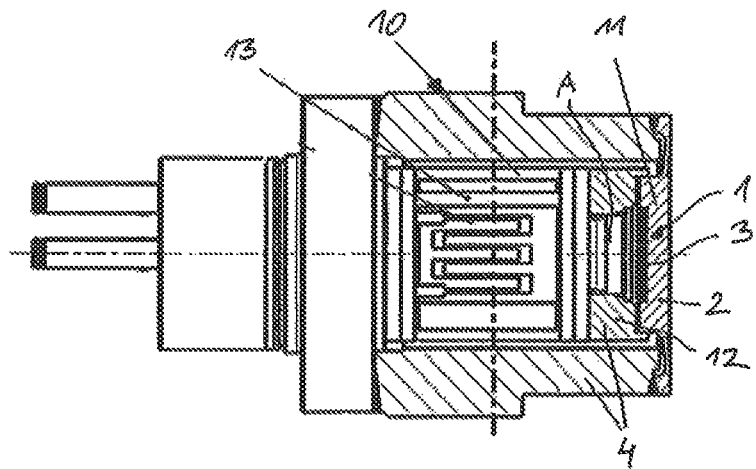
FIG. 3 shows an embodiment of the sensor element in accordance with the invention in the housing of a pressure sensor.

In the embodiment according to FIG. 3, the sensor element 1 in accordance with the invention lies in an enclosed sensor atmosphere A with a defined oxygen fraction in a sealed sensor housing 4 of a pressure sensor 10. The membrane 11 of the pressure sensor 10 is used as the substrate 2, on the inner side of which the strain-sensitive element 3 is applied as a thin film. The housing 4 or the direct vicinity for the strain-sensitive element 3 partly consists of Ni base material. In the illustrated example, the membrane 11 and the pressure transfer element 12 acting on the piezoelectric elements 13 can consist of Ni base material.

Figure 4:
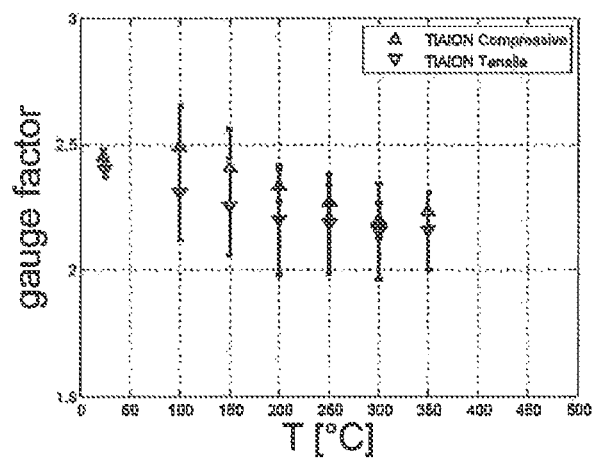
FIG. 4 shows a diagram of the K factor for a strain-sensitive element made of $TiAlO_{0.2}N_{0.8}$ in the temperature range up to 350° C., and FIG. 5 a TCR diagram for $TiAlO_{0.2}N_{0.8}$ in the differential temperature range up to 350° C.
Figure 5:
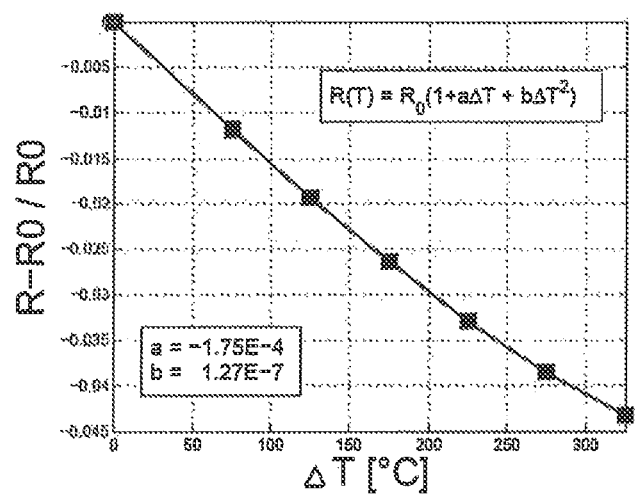

The K factor (gauge factor) and the TCR ((R−R0)/R0) are respectively shown in FIG. 4 and FIG. 5 for a strain-sensitive element made of $TiAlO_{0.2}N_{0.8}$ in a differential temperature range of between 0° C. and 350° C., relating to a reference temperature, wherein the reference temperature is the room temperature in this case.

The invention claimed is:

1. A sensor element comprising a substrate and a strain-sensitive element which is applied to the substrate, said strain-sensitive element measuring deformation of the substrate when pressure is applied or a force is introduced, where the strain-sensitive element consists of $XAlO_yN_{1-y}$, and wherein X is a metal with a high melting temperature in the range of greater than 1400° C. and 0<y<0.4 applies.

2. The sensor element according to claim 1, wherein the strain-sensitive element consists of a composite layer which is applied to the substrate by a PVD process, or by a CVD process.

3. The sensor element according to claim 1, wherein the strain-sensitive element contains at least one metal X from a group consisting of Ti, Ta and Pt.

4. The sensor element according to claim 1, wherein a fraction of aluminium in the strain-sensitive element, which enters into a dielectric connection with nitrogen and oxygen, to a fraction of the metallic component is weighted in such a way that TCR of the strain-sensitive element assumes minimum values.

5. The sensor element according to claim 4, wherein the titanium fraction in a strain-sensitive element made of TiAlON is between 0.4 and 0.5 percent by weight.

6. The sensor element according to claim 1, wherein the strain-sensitive element is arranged in an enclosed sensor atmosphere with a defined oxygen fraction.

7. The sensor element according to claim 6, wherein the strain-sensitive element is arranged in a sealed sensor housing.

8. The sensor element according to claim 1, wherein the substrate consists of Ni base material selected from the group of Haynes 230, a ceramic and a piezoelectric material.

9. The sensor element according to claim 1, wherein the strain-sensitive element comprises a passivation layer.

10. The sensor element according to claim 9, wherein the passivation layer comprises of $Al_2O_3$ or AlN.

11. The sensor element according to claim 2, wherein the composite layer is applied to the substrate by a sputtering process or a vapour-deposition process.

12. The sensor element according to claim 4, wherein TCR of the strain-sensitive element assumes approximately 0.

13. The sensor element according to claim 7, wherein the sensor housing consists at least partly of Ni base material.

* * * * *

UNITED STATES PATENT AND TRADEMARK OFFICE
CERTIFICATE OF CORRECTION

Page 1 of 1

PATENT NO. : 9,618,406 B2
APPLICATION NO. : 14/842193
DATED : April 11, 2017
INVENTOR(S) : Kroeger et al.

It is certified that error appears in the above-identified patent and that said Letters Patent is hereby corrected as shown below:

On the Title Page

Item (73) Assignee should read:
Piezocryst Advanced Sensorics GmbH, Graz (AT)

Signed and Sealed this
Fourth Day of July, 2017

Joseph Matal
*Performing the Functions and Duties of the*
*Under Secretary of Commerce for Intellectual Property and*
*Director of the United States Patent and Trademark Office*